United States Patent [19]

Suganami et al.

[11] Patent Number: 4,911,618
[45] Date of Patent: Mar. 27, 1990

[54] CRYOCOMPRESSOR WITH A SELF-CENTERING PISTON

[75] Inventors: Takuya Suganami; Yoshio Kazumoto, both of Hyogo, Japan

[73] Assignee: Mitsubishi Denki Kabushiki Kaisha, Tokyo, Japan

[21] Appl. No.: 207,408

[22] Filed: Jun. 16, 1988

[51] Int. Cl.$^4$ .............................................. F25B 9/00
[52] U.S. Cl. .......................................... 417/439; 62/6; 60/520; 92/162 R
[58] Field of Search ............................. 417/439; 62/6; 92/162 R, 158, 184; 60/520

[56] References Cited

U.S. PATENT DOCUMENTS

| | | | |
|---|---|---|---|
| 2,657,553 | 11/1953 | Jonkers | 62/6 |
| 3,001,609 | 9/1961 | Macks | 92/192 R |
| 3,365,896 | 1/1968 | Berry | 62/6 |
| 3,640,082 | 2/1972 | Dehne | 62/6 |
| 3,793,846 | 2/1974 | Dehne | 62/6 |
| 4,574,591 | 3/1986 | Bertsch | 62/6 |
| 4,776,260 | 10/1988 | Vincze | 92/162 R |

FOREIGN PATENT DOCUMENTS 763772  3/1954  Fed. Rep. of Germany ........ 92/126

OTHER PUBLICATIONS

"Handbook of Lubrication", vol. II, CRC Press Inc., pp. 105-120, 6/1984, E. R. Booster.

Primary Examiner—Donald E. Stout
Assistant Examiner—D. Scheuermann
Attorney, Agent, or Firm—Sughrue, Mion, Zinn, Macpeak & Seas

[57] ABSTRACT

A cryocompressor includes a check valve arranged in a circuit connecting a compression chamber defined by a piston disposed in a cylinder with an annular gap small enough to provide an expected sealing effect to a buffer chamber also defined by the piston in the cylinder, a cross sectional area of the annular gap between the piston and the cylinder being larger on the side of the compression chamber than on the side of the buffer chamber.

4 Claims, 4 Drawing Sheets

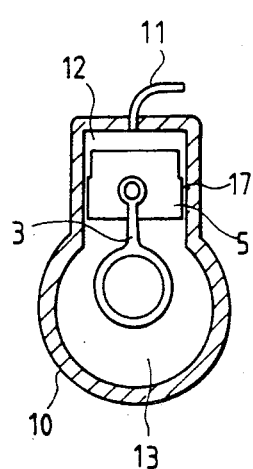
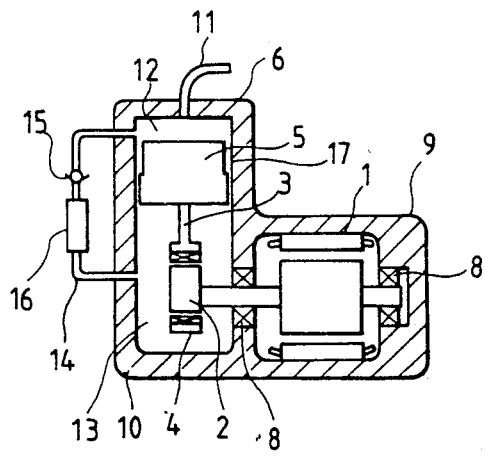
FIG. 1
FIG. 2
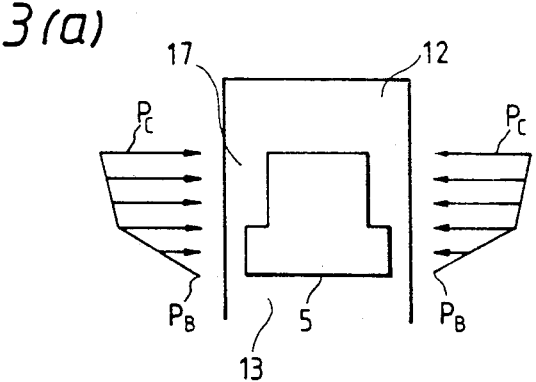
FIG. 3(a)
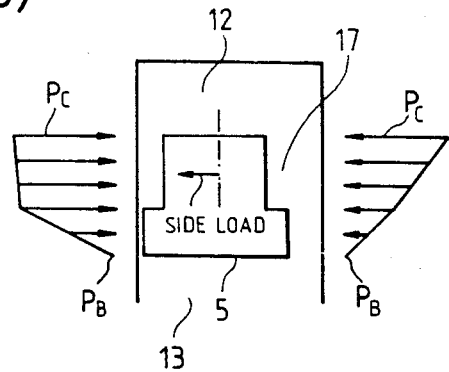
FIG. 3(b)

CRYOCOMPRESSOR WITH A SELF-CENTERING PISTON

BACKGROUND OF THE INVENTION

The present invention relates to a compressor for use in, for example, a Stirling cryogenerator for producing very low temperature.

A machine for producing very low temperature, such a Stirling cryogenerator, utilizes, as one of its main constitutional components, a cryocompressor having a reciprocal piston or pistons for compressing gas such as helium.

FIG. 4 shows a partial cross sectioned front view of an example of a conventional cryocompressor, which was developed by the present inventors, and FIG. 5 is a cross sectional side view of the same. In FIGS. 4 and 5, a reference numeral 1 depicts a motor, 2 a crank shaft to be driven by the motor 1, 3 a connecting rod having one end supported by an eccentric portion of the crank shaft 2 through a bearing 4, 5 a piston connected to the other end of the connecting rod 3 and reciprocating within a cylinder 6, 7 a piston ring mounted on the piston 5 for sealing a chamber above the piston within the cylinder 6, 8 bearings supported by a motor casing 9 for rotatably supporting the crank shaft 2 and 10 a crank case provided between the cylinder 6 and the casing 9, to an upper end of which a gas pipe 11 is connected. A reference numeral 12 depicts a compression chamber formed in the cylinder 6 and a buffer chamber 13 is formed in the crank case 10. The compression chamber 12 is isolated from the buffer chamber 13 by the piston ring 7. A reference numeral 14 depicts a connecting circuit for communicating the compression chamber 12 with the buffer chamber 13 directly, and 15 a check vale provided in the connecting circuit 14 for allowing gas flow only from the buffer chamber 13 to the compression chamber 12.

A purification chamber 16 is provided in the connecting circuit 14 on the buffer chamberside thereof, which is filled with a purifying agent such a as molecular sieve.

In the cryocompressor constructed as above, the piston 5 reciprocates within the cylinder 6 by a rotation of the crank shaft 2 driven by the motor 1 to compress and expand the compression chamber 12 repeatedly to thereby discharge and intake a working gas from and into the gas pipe connected to the compression chamber 12.

In a state where gas pressure, Pc in the compression chamber 12 is higher than gas pressure $P_B$ in the buffer chamber, gas leaks from the compression chamber 12 through an annular gap between the piston ring 7 and the cylinder 6 to the buffer chamber 13. When gas pressure Pc in the compression chamber 12 is becoming lower than gas pressure $P_B$ in the buffer chamber 13, gas is introduced from the buffer chamber 13 through the check valve 15 provided in the connecting circuit 14 to the compression chamber 12. Therefore, as shown in FIG. 6 showing a crank angle with an upper death point being 0°, gas pressure Pc in the compression chamber 12 becomes equal to or higher than gas pressure, $P_B$ in the buffer chamber 13 so that gas flows from the compression chamber 12 through the gap between the piston ring 7 and the cylinder 6 and through the connecting circuit 14 to the compression chamber 12. Thus, as shown in FIG. 6, loads on the bearing and the connecting rod are in one direction, respectively, and therefore the possibility of noise generation due to gaps unavoidably existing in the bearings and the connecting rod is considerably reduced as compared with usual compressors having no check valve.

The cryocompressor such as shown in FIGS. 4 and 6 in which the compression chamber is connected through the connecting circuit having the check valve to the buffer chamber, directly, pressure in the compression chamber is always higher than pressure i the buffer chamber and thus the direction of loads on the connecting rd and the bearing portions is fixed. However, as shown in FIG. 6, since a piston side pressure changes in a direction corresponding to the crank angle and a side load acting on the piston is changed in direction according to the crank angle of the connecting rod, shock noise may be produced in these portions. Further, since the piston ring slides along a wall of the cylinder with a high pressure difference, the life thereof is considerably shortened by severe abrasion.

SUMMARY OF THE INVENTION

An object of the present invention is to provide a cryocompressor in which noise generation in the piston sealing portion is eliminated an the life of the sealing portion is improved.

According to the present invention, the above object can be achieved by a cryocompressor having a compression chamber connected to a buffer chamber through a connecting circuit including a check valve and having a sealing gap between a piston and a cylinder, which includes a compression chamber side gap portion and a buffer chamber side gap portion which is smaller than the compression chamber side gap portion.

In the cryocompressor according to the present invention, high pressure gas leaks from the compression chamber through the gap between the piston and cylinder to the low pressure buffer chamber. However, since the gap width decreases towards the buffer chamber, the gas pressure supports the piston against the piston side load and there is no possibility of contacting with the cylinder wall.

BRIEF DESCRIPTION OF THE DRAWING

FIG. 1 is a partially cross sectioned front view of an embodiment of a cryocompressor according to the present invention;

FIG. 2 is a cross sectional side view of the cryocompressor shown in FIG. 1;

FIGS. 3a and 3b are illustrations of a main portion of the cryocompressor shown in FIGS. 1 and 2 for explanation of an operation thereof;

DETAILED DESCRIPTION OF THE PREFERRED EMBODIMENT

Figure 4:
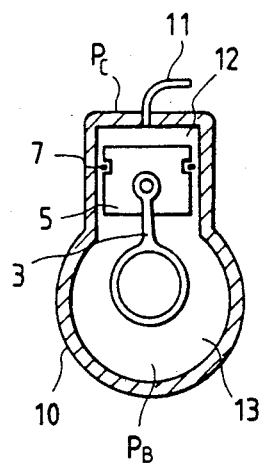
FIG. 4 is a partially cross sectioned front view of a conventional cryocompressor.
Figure 5:
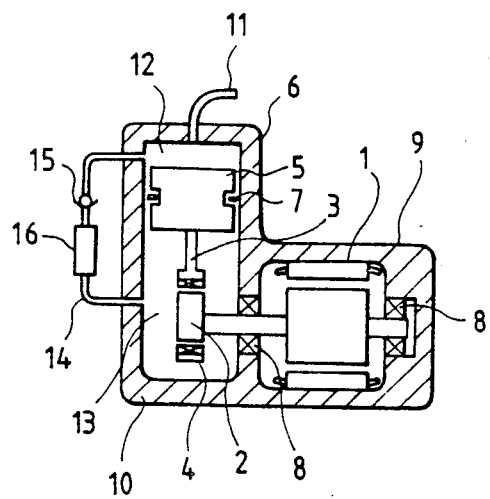
FIG. 5 is a cross sectional side view of the cryocompressor shown in FIG. 4.
Figure 6:
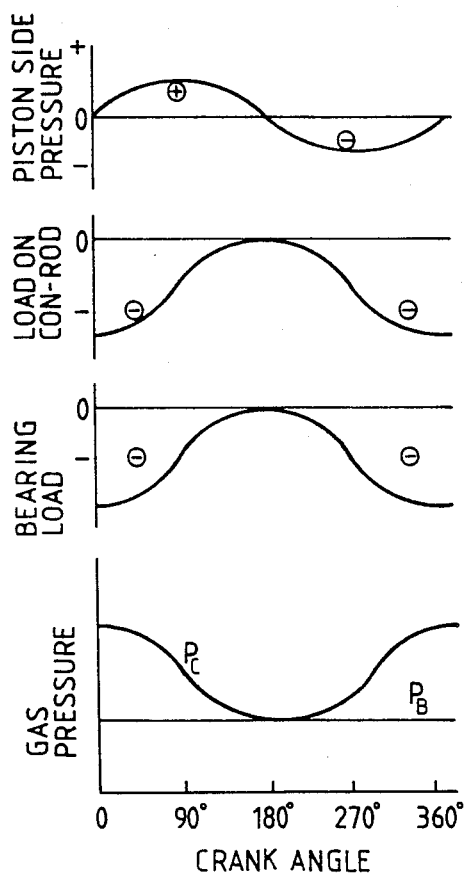
FIG. 6 shows characteristics curves of the conventional cryocompressor.

In FIGS. 1 and 2, reference numerals 1 to 16 depict the same or corresponding portions of FIG. 4 and 5, respectively, and details thereof are omitted for avoidance of duplication A reference numeral 17 depicts a gap formed between a piston 5 having no piston ring and an inner surface of a cylinder 6. An upper portion of the gap 17 is made larger than a lower portion thereof by reducing a diameter of an upper portion of the piston 5. Other portions of this embodiment and a basic operation are substantially the same as those shown in and described with respect to FIGS. 4 and 5.

An operation of the piston in the cryocompressor shown in FIGS. 1 and 2 will be described with reference to FIGS. 3a and 3b. A lower portion of the gap 17 between a lower portion of the piston 5 and the cylinder 6 is selected so that only a minimal amount of leakage of a working gas will occur. As shown in FIG. 3a, when an axis of the piston 5 is registered with that of the cylinder 6, a piston side pressure is symmetrical about the axis thereof at any axial position, causing a pressure distribution to be symmetrical. However, when the piston 5 becomes off-centered with respect to the cylinder 6 as shown in FIG. 3b, the side pressure exerted on the side of the piston 5 in which the gap width is smaller becomes higher than that on the opposite side, which causes the piston 5 to be pushed back so that the axis of the piston 5 and the cylinder 6 become coincident. This action means that the piston side pressure is capable of supporting the piston 5 while floating up with respect to the cylinder 6. Therefore, the sealing between the piston 5 and the cylinder 6 can be obtained without direct contact therebetween in this embodiment. Thus, the problem of abrasion therebetween is solved and there is no shock noise produced thereabout.

Since there is no formation of particulated material due to abrasion between the piston and the cylinder which is to be removed by a purification chamber 16 filled with purifying substance and provided in the connecting circuit 14, such purification chamber may be removed, if necessary. Further, although the piston is shown to have a reduced diameter portion to provide a stepped structure, it is possible to reduce the diameter continuously.

As mentioned hereinbefore, in the cryocompressor according to the present invention in which the compression chamber is directly connected by the connecting circuit having the check valve to the buffer chamber partitioned from the compression chamber by the piston, the portion of the gap between the piston and the cylinder on the higher pressure side, i.e., on the side of the compression chamber is made larger than that on the low pressure side, i.e., on the buffer chamber side, so that the piston is floating up against the piston side load by gas pressure exerted thereon. Thus, the piston is supported within the cylinder without contacting therewith, resulting in no abrasion. Therefore, the problems caused by the contact between the piston and the cylinder are eliminated completely.

We claim:
1. A cryocompressor comprising a cylinder, a piston disposed in said cylinder with an annular gap small enough to provide an expected sealing effect and adapted to reciprocate within said cylinder, a compression chamber defined in said cylinder by said piston, a buffer chamber defined in said cylinder separately from said compression chamber by said piston and a connecting circuit for connecting said compression chamber to said buffer chamber, said connecting circuit including a check valve for allowing a gas flow in a direction from said buffer chamber to said compression chamber, a cross sectional area of said annular gap between said piston and said cylinder being larger on the side of said compression chamber than on the side of said buffer chamber, whereby, when said piston becomes off-center within said cylinder to create a gap which is wider on one side of said piston than on the other side of said piston, the gas within said gap will exert a stronger sideways force on said other side of said piston than on said one side of said piston, thereby urging said piston back to a centered position within said cylinder.

2. The cryocompressor as claimed in claim 1, wherein said piston has a first portion on the side of said compression chamber, said first portion having a reduced diameter.

3. The cyrocompressor as claimed in claim 1, wherein said piston is tapered with a larger diameter on the side of said buffer chamber.

4. A cryocompressor comprising:
a piston disposed in a cylinder with an annular gap small enough to provide an expected sealing effect and adapted to reciprocate within said cylinder;
a compression chamber defined in said cylinder by said piston;
a buffer chamber which is separate from said compression chamber and defined in said cylinder by said piston;
a connecting circuit for connecting said compression chamber to said buffer chamber, including a check valve for allowing a gas flow in a direction from said buffer chamber to said compression chamber; and
means for centering the piston in the cylinder, comprising a cross-sectional area of said annular gap between said piston and said cylinder on the side of said compression chamber which is larger than an area of said annular gap on the side of said buffer chamber.

* * * * *